July 21, 1964     A. C. HOWARD ETAL     3,141,312

SHOCK-ABSORBING DRIVE-TRANSMISSION DEVICE

Filed Jan. 28, 1963

*Inventor*

*By*

*Attorney*

United States Patent Office 3,141,312
Patented July 21, 1964

3,141,312
SHOCK-ABSORBING DRIVE-TRANSMISSION DEVICE
Arthur Clifford Howard and John Arthur Howard, West Horndon, Essex, England, assignors to Rotary Hoes Limited, West Horndon, Essex, England
Filed Jan. 28, 1963, Ser. No. 254,185
Claims priority, application Great Britain Feb. 3, 1962
3 Claims. (Cl. 64—27)

The invention relates to a shock-absorbing drive-transmission device for use, for example, in the drive between the engine and an earth-working rotor of a cultivating machine, for cushioning the engine from reaction torque shocks when the rotor is suddenly subjected to a considerable overload.

According to the invention a drive-transmission device includes radially-spaced, coaxial, inner and outer elements each having at least one abutment which extends radially towards the other element, a resiliently-compressible arcuate member arranged between the elements and having its ends engaged by the respective abutments, and means for setting the elements in a relatively orientated position in which the abutments compressively pre-stress the member and urge its radially-outer surface into engagement with the inner periphery of the outer element.

Preferably, and in accordance with a further feature, both the inner and outer elements have an equal plurality of the abutments equi-angularly spaced around their adjacent circumferences, there being one of the resiliently-compressible arcuate members between the one adjacent sides of the respective abutments, and there being distance pieces engaged between the other adjacent sides of the respective abutments for holding the elements in a relatively orientated position in which the said members are compressively pre-stressed with their radially-outer surfaces in engagement with the inner periphery of the outer element.

Each of the members can be in the form of a block of rubber or similar material.

While the shock-absorbing device of the invention can be included in any appropriate position in the drive it is preferred for it to be located between the rotor and the final drive thereto, as owing to the customary speed-reduction gearing between the engine and the rotor the device is proportionately more effective in that position.

Figure 1:
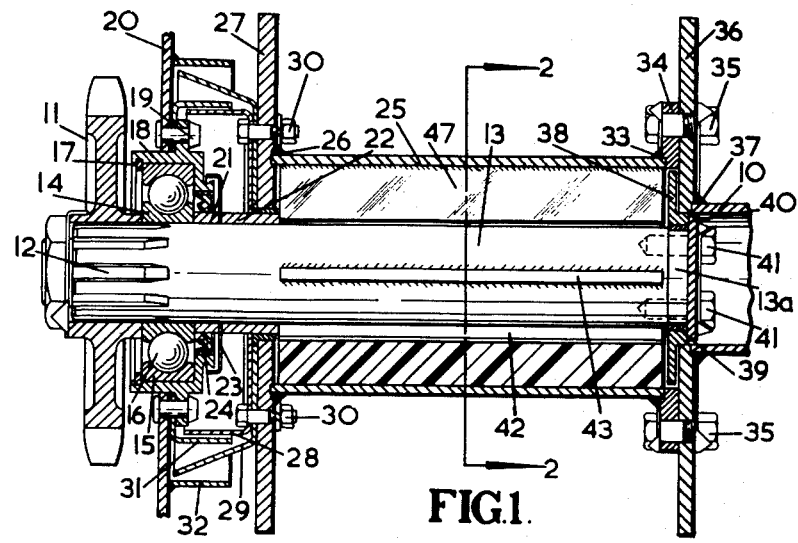
Figure 2:
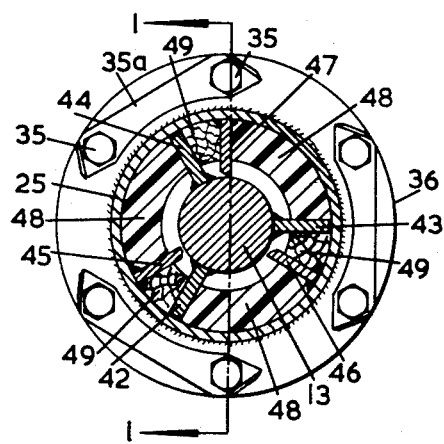

In the accompanying drawings:

FIGURE 1 is a cross-section, generally on the line 1—1 of FIGURE 2, through the drive input end of an earth-working rotor of a cultivating machine, and FIGURE 2 is a section generally on the line 2—2 of FIGURE 1.

Referring to the drawings, the driven end of the rotor shaft, which is arranged for its axis to be transverse to the direction of progression of the cultivating machine, is shown at 10, and it extends towards the right across the machine. The rotor shaft carries earth-working tools which are not shown, and at each end it is journalled in bearings from frame structure of the machine.

The machine illustrated is one in which power, derived from an engine (not shown) of the cultivating machine, is conveyed through gearing, including a final sprocket and chain drive (not shown) to a sprocket 11 which is held rotatively fast on splines 12 of a drive input shaft 13. The rotor shaft 10 is made coaxially fast with shaft 13 in a manner hereinafter described, and the bearing for that end of the rotor shaft is just axially inwardly of the sprocket. The bearing is of the ball-type and it comprises an inner race 14 fast on shaft 13, and an outer race 15 with intervening bearing balls 16. The outer race 15 is located by a circlip 17 within a housing 18 riveted at 19 to a structural member 20 of the machine frame, and the inner race is held abutted to the hub of sprocket 11 by a pair of distance sleeves 21, 22 which jointly support a dust shield 23 about an oil seal 24 for the bearing.

The shock-absorbing device of the invention is arranged between rotor shaft 10 and input shaft 13 and it includes a hollow cylindrical member 25. At its left-hand end in FIGURE 1 member 25 is welded at 26 to a circular end plate 27 having a central hole in which is journalled a sleeve 22 with an intervening bearing liner as shown. Inner and outer dust shields 28, 29 are held by a circle of nuts and bolts 30, and intercalate with coacting dust shields 31 and 32 fast with structural member 20.

The opposite end of cylindrical member 25 is welded at 33 to a radially-extending flange 34 which is secured by a circle of nuts and bolts 35, held against rotation by locking tabs 35a, to a radial flange 36 welded at 37 to the adjacent end of the rotor shaft 10. An L-section distance piece 38 is held on a reduced-diameter portion 13a of the input shaft, with a bearing liner 39 between them, by a washer 40 held to the said shaft by screws 41.

Input shaft 13 provides the inner element of the shock-absorbing device of the invention, and it is provided with three abutments 42, 43 and 44 which are 120° apart. These abutments, which are of an axial length just less than the extent of overlap of the hollow cylindrical member 25 and input shaft 13, extend radially towards the inner surface of member 25 but have clearance therefrom.

Hollow cylindrical member 25 is provided with three radially-inwardly extending abutments 45, 46 and 47 which are of the same axial length as the abutments 42, 43 and 44 and extend up to the outer surface of input shaft 13 with clearance.

Between each of the respective pairs of abutments 42 and 46, 43 and 47, 44 and 45 is inserted a resiliently-compressible member 48 in the form of a block of rubber, and between each of the respective pairs of abutments 45 and 42, 46 and 43, 47 and 44 is inserted a block 49, which may be of wood. The members 48 and blocks 49 are axially located between end plate 27 and distance piece 38.

The device is assembled with the members 48 in an unstressed condition in which the respective pairs of abutments 45 and 42, 46 and 43, 47 and 44 may even be in engagement with each other. The hollow cylindrical member 25 is then orientated relatively to the input shaft 13, in the counterclockwise direction in FIGURE 2, to pre-stress the members 48 compressively in the circumferential direction, and the blocks 49 are then inserted to hold the members 48 in their pre-stressed condition. Thereafter distance piece 38 is placed in position and held by washer 40 and screws 41, and flange 36 of the rotor shaft is connected to flange 34 by the nuts and bolts 35. The widths of the blocks 49, coupled with the compressive characteristics of the members 48 are chosen for providing a desired degree of pre-stressing of the latter.

The members 48 can be unattached to the elements 13 and 25 and their abutments, but upon the insertion of the blocks 49 the members 48 become bowed outwardly for their radially-outer surfaces to engage the radially-inner surface of the hollow cylindrical member 25. It will be seen, therefore, that if the member 25 receives a clockwise-acting shock (e.g., in the case where the earth-working rotor it drives encounters a tree stump or a rock) the members 48 will be further compressed so as to absorb a proportion of the shock, and at the same time a further proportion of the shock, and torsional vibration will be absorbed owing to the frictional contact between the radially-outer surfaces of the members 48 acting, brakewise on the inner periphery of the hollow cylindrical member 25. Thus, the shock is not directly communicated to the input shaft 13 or to the engine and transmission means by which it is driven, and if the obstruction is broken down by the rotor the members 48 can afterwards expand to their initial pre-stressed condition. In doing that they become progressively un-bowed so that their radially-outer surfaces at least tend to disengage from the inner periphery of the hollow cylindrical member 25 and progressively release the braking action thereon.

While, in this specific example, the device is inserted between the rotor shaft 10 of a rotary cultivating machine and the coaxial input shaft 13, it will be understood that it could instead be inserted between two other coaxial elements anywhere in the drive from the engine to the rotor shaft, and it will also be appreciated that the shock-cushioning characteristics of the said device can be used effectively in other applications.

What we claim as our invention and desire to secure by Letters Patent of the United States is:

1. A shock-absorbing drive-transmission device comprising a cylindrical driving element and a cylindrical driven element, one of these elements being tubular and arranged coaxially about the other element, an equal plurality of respective abutment means fast with said elements and equi-angularly spaced around their adjacent circumferences, said abutment means of each element extending radially towards the other element, said abutment means extending longitudinally of the element which carries it, to provide opposed side faces, said abutment means of one element intercalated with the abutment means of the other element, said abutment means and said elements defining a circle of cells which is coaxial with said elements, respective resiliently-compressible arcuate members arranged in alternate ones of the cells, each said arcuate member having one end abutted by a side face of an abutment means of one element and the opposite end abutted by a side face of an abutment means of the other element, and respective distance pieces arranged in the intermediate ones of the cells, each said distance piece inserted between the other sides of adjacent abutment means of the two elements being of a width to set said elements in a relatively orientated position in which the abutment means compressively pre-stress the members and urge their respective radially-outer surfaces into engagement with the inner periphery of the tubular element.

2. A shock-absorbing drive-transmission device according to claim 1 in which the arcuate members are of rubber.

3. A shock-absorbing drive-transmission device according to claim 1 in which the distance pieces are of wood.

References Cited in the file of this patent

UNITED STATES PATENTS

| | | |
|---|---|---|
| 1,850,210 | Krotee | Mar. 22, 1932 |
| 2,301,659 | Ricefield | Nov. 10, 1942 |
| 2,621,493 | Croset | Dec. 16, 1952 |

FOREIGN PATENTS

| | | |
|---|---|---|
| 183,014 | Great Britain | June 20, 1922 |